US007361264B2

(12) United States Patent
Vierheilig

(10) Patent No.: US 7,361,264 B2
(45) Date of Patent: Apr. 22, 2008

(54) MIXED METAL OXIDE ADDITIVES

(75) Inventor: Albert A. Vierheilig, Savannah, GA (US)

(73) Assignee: Intercat, Inc., Manasquan, NJ (US)

( * ) Notice: Subject to any disclaimer, the term of this patent is extended or adjusted under 35 U.S.C. 154(b) by 326 days.

(21) Appl. No.: 11/137,764

(22) Filed: May 25, 2005

(65) Prior Publication Data
US 2006/0027485 A1 Feb. 9, 2006

Related U.S. Application Data

(60) Provisional application No. 60/576,146, filed on Jun. 2, 2004.

(51) Int. Cl.
C10G 11/02 (2006.01)

(52) U.S. Cl. ............ 208/120.25; 208/108; 208/111.01; 208/120.35

(58) Field of Classification Search ............ 208/120.25
See application file for complete search history.

(56) References Cited

U.S. PATENT DOCUMENTS

| | | | |
|---|---|---|---|
| 2,992,191 A | 7/1961 | Erickson | |
| 3,679,763 A | 7/1972 | Livingston | |
| 3,793,003 A | 2/1974 | Othmer | |
| 3,857,921 A | 12/1974 | Tamura et al. | |
| 3,869,500 A | 3/1975 | Kominami et al. | |
| 3,894,164 A | 7/1975 | Dismukes et al. | |
| 3,988,425 A | 10/1976 | Jockel et al. | |
| 3,992,498 A | 11/1976 | Morton et al. | |
| 4,010,233 A | 3/1977 | Winter et al. | |
| 4,016,189 A | 4/1977 | Muller et al. | |
| 4,048,244 A | 9/1977 | Hayes | |
| 4,052,296 A | 10/1977 | Montagna | |
| 4,071,436 A | 1/1978 | Blanton, Jr. et al. | |
| 4,072,600 A | 2/1978 | Schwartz | |
| 4,082,520 A | 4/1978 | Baron et al. | |
| 4,093,535 A | 6/1978 | Schwartz | |
| 4,097,353 A | 6/1978 | Kishida et al. | |
| 4,131,496 A | 12/1978 | Weitzel et al. | |
| 4,147,763 A | 4/1979 | McKinzie et al. | |
| 4,153,535 A | 5/1979 | Vasalos et al. | |
| 4,162,963 A | 7/1979 | Gorin | |
| 4,173,454 A | 11/1979 | Heins | |
| 4,192,855 A | 3/1980 | Ginger | |
| 4,199,435 A | 4/1980 | Chessmore et al. | |
| 4,238,317 A | 12/1980 | Vasalos et al. | |
| 4,247,730 A | 1/1981 | Brunelle et al. | |
| 4,254,558 A | 3/1981 | Mayer | |
| 4,254,616 A | 3/1981 | Siminski et al. | |
| 4,255,403 A | 3/1981 | Mayer et al. | |
| 4,261,862 A | 4/1981 | Kinoshita et al. | |
| 4,263,020 A | 4/1981 | Eberly, Jr. | |
| 4,274,942 A | 6/1981 | Bartholic et al. | |
| 4,274,981 A | 6/1981 | Suzuki et al. | |
| 4,280,898 A | 7/1981 | Tatterson et al. | |
| 4,282,084 A | 8/1981 | Gross et al. | |
| 4,325,817 A | 4/1982 | Bartholic et al. | |
| 4,358,297 A | 11/1982 | Eberly, Jr. | |
| 4,374,819 A | 2/1983 | Palilla et al. | |
| 4,376,103 A | 3/1983 | Bertolacini et al. | |
| 4,381,993 A | 5/1983 | Nevitt | |
| 4,422,888 A | 12/1983 | Stutius | |
| 4,425,312 A | 1/1984 | Brignac | |
| 4,432,864 A | 2/1984 | Myers et al. | |
| 4,432,896 A | 2/1984 | Sugiyama et al. | |
| 4,434,044 A | 2/1984 | Busch et al. | |
| 4,452,854 A | 6/1984 | Merriam et al. | |
| 4,465,588 A | 8/1984 | Occelli et al. | |
| 4,465,779 A | 8/1984 | Occelli et al. | |
| 4,469,588 A | 9/1984 | Hettinger, Jr. et al. | |
| 4,469,589 A | 9/1984 | Yoo et al. | |
| 4,472,267 A | 9/1984 | Yoo et al. | |
| 4,481,103 A | 11/1984 | Krambeck et al. | |
| 4,485,184 A | 11/1984 | Hettinger, Jr. et al. | |
| 4,492,677 A | 1/1985 | Yoo et al. | |
| 4,492,678 A | 1/1985 | Yoo et al. | |
| 4,495,304 A | 1/1985 | Yoo et al. | |
| 4,495,305 A | 1/1985 | Yoo et al. | |
| 4,515,683 A | 5/1985 | Beck et al. | |
| 4,519,897 A | 5/1985 | De Jong | |
| 4,520,120 A | 5/1985 | Mitchell et al. | |
| 4,521,389 A | 6/1985 | Blanton, Jr. et al. | |
| 4,522,937 A | 6/1985 | Yoo et al. | |
| 4,549,958 A | 10/1985 | Beck et al. | |

(Continued)

FOREIGN PATENT DOCUMENTS

CN 1275435 12/2000

(Continued)

OTHER PUBLICATIONS

Cavani et al., Hydrotalcite-Type Anionic Clays: Preparation, Properties and Applications, Catalysis Today, 11 (1991), pp. 173-301.

(Continued)

Primary Examiner—Tam M. Nguyen
(74) Attorney, Agent, or Firm—Tanzina Chowdhury

(57) ABSTRACT

The present invention is directed to methods for mitigating the deleterious effect of at least one metal on an FCC catalyst. This objective is achieved by using a mixed metal oxide compound comprising magnesium and aluminum, that has not been derived from a hydrotalcite compound, and having an X-ray diffraction pattern displaying at least a reflection at a two theta peak position at about 43 degrees and about 62 degrees, wherein the ratio of magnesium to aluminum in the compound is from about 0.6:1 to about 10:1. In one embodiment, the ratio of magnesium to aluminum in the compound is from about 1:1 to about 6:1. In one embodiment, the ratio of magnesium to aluminum in the compound is from about 1.5:1 to about 10:1. In another embodiment, the invention is directed to methods wherein the ratio of magnesium to aluminum in the compound is from about 1.5:1 to about 6:1.

53 Claims, 5 Drawing Sheets

U.S. PATENT DOCUMENTS

| | | |
|---|---|---|
| 4,585,632 A | 4/1986 | Schneider et al. |
| 4,602,993 A | 7/1986 | Myers |
| 4,609,537 A | 9/1986 | Tolpin et al. |
| 4,609,539 A | 9/1986 | Horecky et al. |
| 4,613,428 A | 9/1986 | Edison |
| 4,617,175 A | 10/1986 | Tolpin et al. |
| 4,622,210 A | 11/1986 | Hirschberg et al. |
| 4,642,178 A | 2/1987 | Yoo et al. |
| 4,650,564 A | 3/1987 | Occelli et al. |
| 4,692,318 A | 9/1987 | Tolpin et al. |
| 4,708,785 A | 11/1987 | Myers |
| 4,708,786 A | 11/1987 | Occelli |
| 4,728,635 A | 3/1988 | Bhattacharyya et al. |
| 4,735,705 A | 4/1988 | Burk, Jr. et al. |
| 4,744,962 A | 5/1988 | Johnson et al. |
| 4,790,982 A | 12/1988 | Yoo et al. |
| 4,824,815 A | 4/1989 | Kugler |
| 4,836,993 A | 6/1989 | Bertolacini et al. |
| 4,866,019 A | 9/1989 | van Broekhoven et al. |
| 4,883,783 A | 11/1989 | Burk, Jr. et al. |
| 4,889,615 A | 12/1989 | Chin et al. |
| 4,904,627 A | 2/1990 | Bhattacharyya |
| 4,944,865 A | 7/1990 | Occelli et al. |
| 4,946,581 A | 8/1990 | van Broekhoven et al. |
| 4,952,382 A | 8/1990 | van Broekhoven |
| 4,957,718 A | 9/1990 | Yoo et al. |
| 4,963,520 A | 10/1990 | Yoo et al. |
| 4,970,191 A | 11/1990 | Schutz |
| 4,973,399 A | 11/1990 | Green et al. |
| 5,037,538 A | 8/1991 | Chin et al. |
| 5,079,203 A | 1/1992 | Pinnavaia et al. |
| 5,114,898 A | 5/1992 | Pinnavaia et al. |
| 5,130,012 A | 7/1992 | Edwards et al. |
| 5,153,156 A | 10/1992 | Schutz et al. |
| 5,174,890 A | 12/1992 | Occelli |
| 5,229,091 A | 7/1993 | Buchanan et al. |
| 5,246,899 A | 9/1993 | Bhattacharyya |
| 5,250,279 A | 10/1993 | Preston et al. |
| 5,260,240 A | 11/1993 | Guthrie et al. |
| 5,262,203 A | 11/1993 | Lesher et al. |
| 5,270,272 A | 12/1993 | Galperin et al. |
| 5,288,675 A | 2/1994 | Kim |
| 5,292,492 A | 3/1994 | Buchanan et al. |
| 5,324,416 A | 6/1994 | Cormier et al. |
| 5,346,563 A | 9/1994 | Allen et al. |
| 5,364,517 A | 11/1994 | Dieckmann et al. |
| 5,371,055 A | 12/1994 | Cormier et al. |
| 5,380,442 A | 1/1995 | Yan |
| 5,384,301 A | 1/1995 | Flytzani-Stephanopoulos et al. |
| 5,399,327 A | 3/1995 | Kim |
| 5,399,329 A | 3/1995 | Schutz et al. |
| 5,407,878 A | 4/1995 | Kim |
| 5,422,332 A | 6/1995 | Demmel |
| 5,426,083 A | 6/1995 | Bhattacharyya et al. |
| 5,429,727 A | 7/1995 | Vogt et al. |
| 5,437,783 A | 8/1995 | Cuthbert et al. |
| 5,458,861 A | 10/1995 | Buchanan et al. |
| 5,459,259 A | 10/1995 | Pinnavaia et al. |
| 5,472,677 A | 12/1995 | Farris et al. |
| 5,492,684 A | 2/1996 | Buchanan et al. |
| 5,494,879 A | 2/1996 | Jin et al. |
| 5,503,814 A | 4/1996 | Demmel |
| 5,507,980 A | 4/1996 | Kelkar et al. |
| 5,514,351 A | 5/1996 | Buchanan et al. |
| 5,514,361 A | 5/1996 | Martin et al. |
| 5,518,704 A | 5/1996 | Kelkar et al. |
| 5,545,604 A | 8/1996 | Demmel |
| 5,547,548 A | 8/1996 | Siddoway |
| 5,547,648 A | 8/1996 | Buchanan et al. |
| 5,552,362 A | 9/1996 | Immel et al. |
| 5,559,067 A | 9/1996 | Lerner et al. |
| 5,565,181 A | 10/1996 | Dieckmann et al. |
| 5,567,224 A | 10/1996 | Kundrat |
| 5,578,286 A | 11/1996 | Martin et al. |
| 5,586,714 A | 12/1996 | Curicuta et al. |
| 5,591,417 A | 1/1997 | Buchanan et al. |
| 5,591,418 A | 1/1997 | Bhattacharyya et al. |
| 5,593,558 A | 1/1997 | Sugino et al. |
| 5,609,845 A | 3/1997 | Cimini et al. |
| 5,618,406 A | 4/1997 | Demmel |
| 5,627,123 A | 5/1997 | Kim |
| 5,652,060 A | 7/1997 | Uchida et al. |
| 5,687,565 A | 11/1997 | Modica et al. |
| 5,705,136 A | 1/1998 | Drago et al. |
| 5,723,039 A | 3/1998 | Zosimov et al. |
| 5,728,358 A | 3/1998 | Avidan et al. |
| 5,728,363 A | 3/1998 | Martin et al. |
| 5,728,364 A | 3/1998 | Martin et al. |
| 5,728,365 A | 3/1998 | Martin et al. |
| 5,728,366 A | 3/1998 | Martin et al. |
| 5,730,951 A | 3/1998 | Martin et al. |
| 5,741,469 A | 4/1998 | Bhore et al. |
| 5,750,020 A | 5/1998 | Bhattacharyya et al. |
| 5,753,198 A | 5/1998 | Ayala et al. |
| 5,762,892 A | 6/1998 | Kasahara et al. |
| 5,776,424 A | 7/1998 | Martin et al. |
| 5,792,338 A | 8/1998 | Gosling et al. |
| 5,792,436 A | 8/1998 | Feeley et al. |
| 5,805,973 A | 9/1998 | Coffinberry et al. |
| 5,814,291 A | 9/1998 | Kelkar |
| 5,843,862 A | 12/1998 | Bhattacharyya |
| 5,866,496 A | 2/1999 | Albers et al. |
| 5,874,019 A | 2/1999 | Uchida et al. |
| 5,882,616 A | 3/1999 | Ziebarth et al. |
| 5,882,622 A | 3/1999 | Easley et al. |
| 5,894,035 A | 4/1999 | Cinibulk et al. |
| 5,908,804 A | 6/1999 | Menon et al. |
| 5,914,288 A | 6/1999 | Turk et al. |
| 5,914,293 A | 6/1999 | Bhattacharyya et al. |
| 5,916,129 A | 6/1999 | Modica et al. |
| 5,928,496 A | 7/1999 | Albers et al. |
| 5,928,497 A | 7/1999 | Iaccino |
| 5,939,353 A | 8/1999 | Bhattacharyya et al. |
| 5,948,726 A | 9/1999 | Moskovitz et al. |
| 5,951,851 A | 9/1999 | Poirier et al. |
| 5,955,045 A | 9/1999 | Baur et al. |
| 5,958,359 A | 9/1999 | Buchanan et al. |
| 5,965,100 A | 10/1999 | Khanmamedov |
| 5,968,870 A | 10/1999 | Iizuka et al. |
| 5,972,828 A | 10/1999 | Doi et al. |
| 5,984,997 A | 11/1999 | Bickmore et al. |
| 5,990,030 A | 11/1999 | McCauley |
| 5,998,232 A | 12/1999 | Maruska |
| 6,001,241 A | 12/1999 | Gosling et al. |
| 6,010,619 A | 1/2000 | Wise et al. |
| 6,027,636 A | 2/2000 | Poirier et al. |
| 6,027,704 A | 2/2000 | Johnson et al. |
| 6,028,023 A | 2/2000 | Vierheilig |
| 6,030,597 A | 2/2000 | Buchanan et al. |
| 6,074,984 A | 6/2000 | Demmel et al. |
| 6,129,833 A | 10/2000 | McCauley |
| 6,129,834 A | 10/2000 | Peters et al. |
| 6,156,696 A | 12/2000 | Albers et al. |
| 6,171,991 B1 | 1/2001 | Stamires et al. |
| 6,180,764 B1 | 1/2001 | Noweck et al. |
| 6,200,445 B1 | 3/2001 | Yokota et al. |
| 6,274,530 B1 | 8/2001 | Cayton et al. |
| 6,281,164 B1 | 8/2001 | Demmel et al. |
| 6,306,793 B1 | 10/2001 | Turk et al. |
| 6,333,290 B1 | 12/2001 | Stamires et al. |
| 6,338,830 B1 | 1/2002 | Moskovitz et al. |
| 6,338,831 B1 | 1/2002 | Strehlau et al. |
| 6,376,405 B1 | 4/2002 | Stamires et al. |
| 6,419,890 B1 | 7/2002 | Li |

| | | |
|---|---|---|
| 6,440,887 B1 | 8/2002 | Stamires et al. |
| 6,468,488 B1 | 10/2002 | Stamires et al. |
| 6,479,421 B1 | 11/2002 | Vierheilig |
| 6,497,811 B1 | 12/2002 | Myrstad et al. |
| 6,503,867 B1 | 1/2003 | Stamires et al. |
| 6,506,358 B1 | 1/2003 | Stamires et al. |
| 6,514,473 B2 | 2/2003 | Noweck et al. |
| 6,517,795 B1 | 2/2003 | Noweck et al. |
| 6,531,052 B1 | 3/2003 | Frye et al. |
| 6,541,409 B1 | 4/2003 | Jones et al. |
| 6,579,820 B2 | 6/2003 | Tamhankar et al. |
| 6,585,945 B2 | 7/2003 | Wu et al. |
| 6,589,902 B1 | 7/2003 | Stamires et al. |
| 6,593,265 B2 | 7/2003 | Stamires et al. |
| 6,610,264 B1 | 8/2003 | Buchanan et al. |
| 6,699,448 B2 | 3/2004 | Wu et al. |
| 6,716,338 B2 | 4/2004 | Madon et al. |
| 6,777,370 B2 | 8/2004 | Chen |
| 6,866,834 B2 | 3/2005 | Nakamura et al. |
| 6,914,033 B2 | 7/2005 | Gislason et al. |
| 6,923,945 B2 | 8/2005 | Chen |
| 6,929,736 B2 | 8/2005 | Vierheilig |
| 7,067,093 B2 | 6/2006 | Vierheilig et al. |
| 2003/0039597 A1 | 2/2003 | Deeba et al. |
| 2003/0089640 A1 | 5/2003 | Madon et al. |
| 2003/0096697 A1 | 5/2003 | Vierheilig |
| 2003/0203806 A1 | 10/2003 | Vierheilig |
| 2004/0031730 A1 | 2/2004 | Gislason et al. |
| 2004/0077492 A1 | 4/2004 | Yaluris et al. |
| 2004/0086442 A1 | 5/2004 | Vierheilig |
| 2004/0152586 A1 | 8/2004 | Ou et al. |
| 2005/0038306 A1 | 2/2005 | Beech et al. |
| 2005/0095188 A1 | 5/2005 | Matsumoto et al. |
| 2005/0207956 A1 | 9/2005 | Vierheilig |
| 2005/0227058 A1 | 10/2005 | Ohashi et al. |
| 2005/0234278 A1 | 10/2005 | van Egmond et al. |

FOREIGN PATENT DOCUMENTS

| | | |
|---|---|---|
| EP | 0045170 | 2/1982 |
| EP | 158858 | 10/1991 |
| EP | 0263171 | 11/1992 |
| EP | 0318808 | 2/1996 |
| EP | 0740580 | 10/1999 |
| EP | 1156012 | 11/2001 |
| EP | 0636107 | 2/2002 |
| EP | 1241329 | 9/2002 |
| WO | WO-95/03876 | 2/1995 |
| WO | WO-95/17265 | 6/1995 |
| WO | WO-99/26714 | 6/1999 |
| WO | WO 99/42201 | 8/1999 |
| WO | WO-02/058819 | 8/2002 |
| WO | WO-03/018178 | 3/2003 |
| WO | WO-2005/060519 | 7/2005 |

OTHER PUBLICATIONS

Corma et al., "Simultaneous Catalytic Removal of Sox and Nox with Hydrotalcite-derived Mixed Oxides Containing Copper, and their Possibilities to be Used in FCC Units," J. of Catalysts, vol. 170, pp. 140-149 (1997).

Shannon et al., "Hydrotatcite-derived mixed oxides containing copper: Catalysts for the removal of Nitric Oxide," J. Chem. Soc., Faraday Trans., vol. 92, pp. 4331-4336 (1996).

Taylor, "Crystal Structures of Some Double Hydroxide Minerals," Mineralogical Magazine, vol. 39, No. 304, pp. 377-389 (Dec. 1973).

International Search Report and Written Opinion for International Application PCT/US05/18598, mailed Aug. 16, 2007.

MIXED METAL OXIDE ADDITIVES

This application claims the benefit of provisional application U.S. Ser. No. 60/576,146, filed Jun. 2, 2004, which is hereby incorporated by reference into the subject application in its entirety.

Throughout this application, various publications are referenced. The disclosures of these publications in their entireties are hereby incorporated by reference into this application in order to more fully describe the state of the art as known to those skilled therein as of the date of the invention described and claimed herein.

The disclosure of this patent document contains material subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

FIELD OF THE INVENTION

The present invention provides methods of mitigating the deleterious effect of metals on catalytic cracking. This objective is achieved through the use of mixed metal oxide (MMO) additives which act to trap metals.

BACKGROUND OF THE INVENTION

Catalytic cracking is a petroleum refining process that is applied commercially on a very large scale. A majority of the refinery gasoline blending pool in the United States is produced by this process, with almost all being produced using the fluid catalytic cracking (FCC) process. In the FCC process, heavy hydrocarbon fractions are converted into lighter products by reactions taking place at high temperatures in the presence of a catalyst, with the majority of the conversion or cracking occurring in the gas phase. The FCC hydrocarbon feedstock (feedstock) is thereby converted into gasoline and other liquid cracking products as well as lighter gaseous cracking products of four or fewer carbon atoms per molecule. These products, liquid and gas, consist of saturated and unsaturated hydrocarbons.

In FCC processes, feedstock is injected into the riser section of a FCC reactor, where the feedstock is cracked into lighter, more valuable products upon contacting hot catalyst circulated to the riser-reactor from a catalyst regenerator. As the endothermic cracking reactions take place, carbon is deposited onto the catalyst. This carbon, known as coke, reduces the activity of the catalyst and the catalyst must be regenerated to revive its activity. The catalyst and hydrocarbon vapors are carried up the riser to the disengagement section of the FCC reactor, where they are separated. Subsequently, the catalyst flows into a stripping section, where the hydrocarbon vapors entrained with the catalyst are stripped by steam injection. Following removal of occluded hydrocarbons from the spent cracking catalyst, the stripped catalyst flows through a spent catalyst standpipe and into a catalyst regenerator.

Typically, catalyst is regenerated by introducing air into the regenerator and burning off the coke to restore catalyst activity. These coke combustion reactions are highly exothermic and as a result, heat the catalyst. The hot, reactivated catalyst flows through the regenerated catalyst standpipe back to the riser to complete the catalyst cycle. The coke combustion exhaust gas stream rises to the top of the regenerator and leaves the regenerator through the regenerator flue. The exhaust gas generally contains nitrogen oxides (NOx), sulfur oxides (SOx), carbon monoxide (CO), oxygen ($O_2$), ammonia, nitrogen and carbon dioxide ($CO_2$).

The three characteristic steps of the FCC process that the cracking catalyst undergoes can therefore be distinguished: 1) a cracking step in which feedstock is converted into lighter products, 2) a stripping step to remove hydrocarbons adsorbed on the catalyst, and 3) a regeneration step to burn off coke deposited on the catalyst. The regenerated catalyst is then reused in the cracking step.

The presence of metal contaminants in feedstock presents a serious problem. Common metal contaminants are iron (Fe), nickel (Ni), sodium (Na), and vanadium (V). Some of these metals may promote dehydrogenation reactions during the cracking sequence and result in increased amounts of coke and light gases at the expense of gasoline production. Some of these metals may also have a detrimental effect on the FCC of feedstock and cracking catalyst stability and crystallinity.

During the cracking catalyst regeneration process, metals present in the catalyst itself may volatilize under the hydrothermal conditions and re-deposit on the catalyst. Silicon (Si) is an example of such a metal.

All of these metals, whether initially present in the feedstock, the cracking catalyst, or some other compound present in the FCC reactor, may lead to loss of activity, selectivity, stability, and crystallinity of the active component of the cracking catalyst.

Vanadium poisons the cracking catalyst and reduces its activity. The literature in this field has reported that the V compounds present in feedstock become incorporated in the coke which is deposited on the cracking catalyst and is then oxidized to vanadium pentoxide in the regenerator as the coke is burned off. One possible pathway by which V reduces catalyst activity involves vanadium pentoxide reacting with water vapor present in the regenerator to form vanadic acid. Vanadic acid may then react with the zeolite catalyst, destroying its crystallinity and reducing its activity.

Because compounds containing V and other metals cannot, in general, be readily removed from the cracking unit as volatile compounds, the usual approach has been to passivate these compounds under conditions encountered during the cracking process. Passivation may involve incorporating additives into the cracking catalyst or adding separate additive particles along with the cracking catalyst. These additives combine with the metals and therefore act as "traps" or "sinks" so that the active component of the cracking catalyst is protected. These metal contaminants are removed along with the catalyst withdrawn from the system during its normal operation and fresh metal trap is added with makeup catalyst so as to effect a continuous withdrawal of the detrimental metal contaminants during operation. Depending upon the level of the harmful metals in the feedstock, the quantity of additive may be varied relative to the makeup catalyst in order to achieve the desired degree of metals passivation.

Industrial facilities are continuously trying to find new and improved methods to increase the performance of cracking catalysts. The present invention is directed to these and other important ends.

SUMMARY OF THE INVENTION

The present invention is directed to methods for mitigating the detrimental effect of metals on catalytic cracking. This objective is achieved through the use of a mixed metal oxide (MMO) compound, that has not been derived from a hydrotalcite compound, and having an X-ray diffraction (XRD) pattern displaying at least a reflection at a 2-theta peak position at about 43 degrees and at about 62 degrees, wherein the ratio of magnesium to aluminum in the compound is from about 0.6:1 to about 10:1. In one embodiment, the ratio of Mg to Al in the compound is from about 0.6:1 to about 10:1. In another embodiment, the ratio of Mg to Al in the compound is from about 0.6:1 to about 6:1. In another embodiment, the ratio of Mg to Al in the compound is from about 1:1 to about 6:1.

The MMO compound can be used alone or in combination with metallic oxidants, supports, or other components to improve the performance of FCC catalysts. The compound can be in the form of a slurry or a shaped body. The shaped body can be a dried shaped body and/or a calcined shaped body.

DETAILED DESCRIPTION OF THE INVENTION

Figure 1:
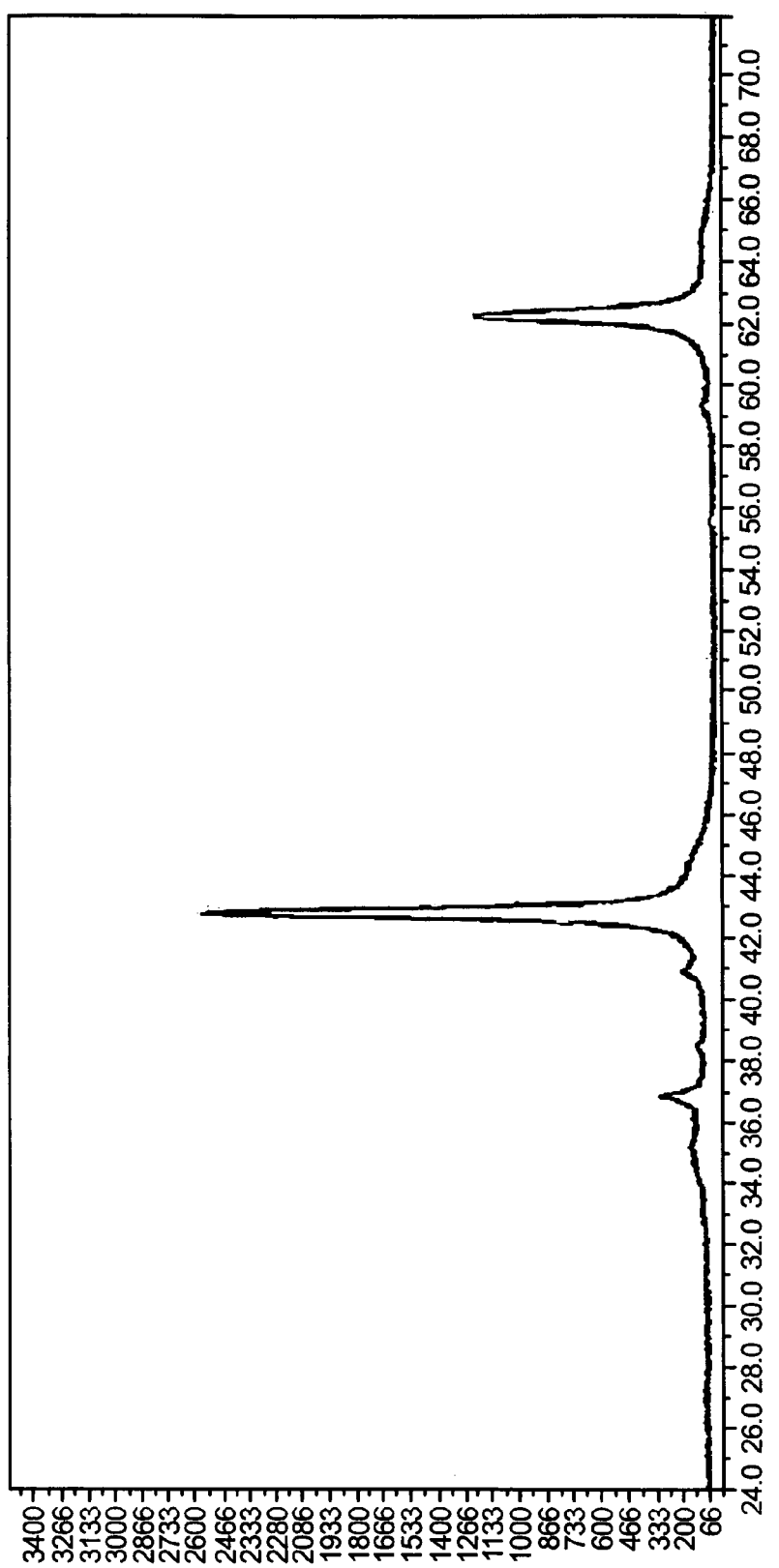
FIG. 1 is the XRD pattern of a calcined magnesium aluminate mixed metal oxide (MMO), compound that is a precursor to a hydrotalcite-like compound (HTLP) where the ratio of Mg to Al is 4:1.

It has been unexpectedly discovered that the mixed metal oxides (MMO) of the present invention, which can also be referred to as precursors to hydrotalcite (HTLP) compounds, as described in U.S. Pat. Nos. 6,028,023 and 6,479,421, and copending U.S. Pat. application Nos. 10/290,012 (filed Nov. 7, 2002) and application Ser. No. 10/444,629 (filed May 23, 2003), are useful in mitigating the deleterious effect of metals on FCC catalysts. Thus, the present invention is directed to methods for mitigating the deleterious effect of metals on FCC catalysts comprising employing an additive compound comprising magnesium and aluminum and having an X-ray diffraction (XRD) pattern displaying at least a reflection at a 2-theta peak position at about 43 degrees and at about 62 degrees, wherein the ratio of Mg to Al in the compound is from about 0.6:1 to about 10:1. In one embodiment, the ratio of Mg to Al in the compound is from about 1:1 to about 6:1. In one embodiment, the ratio of Mg to Al in the compound is from about 1.5:1 to about 10:1. In another embodiment, the ratio of Mg to Al in the compound is from about 1.5:1 to about 6:1.

The term "HTL" as used herein means hydrotalcite-like.
The term "HTLP" as used herein means hydrotalcite-like precursor or precursor to hydrotalcite-like.
The term "MMO" as used herein means mixed metal oxide.
The term "XRD" as used herein means x-ray diffraction.

In one embodiment, the invention provides methods for increasing the performance of FCC catalysts by utilizing a MMO compound with the FCC catalyst. In one embodiment, the MMO compound is a magnesium aluminate compound. In another embodiment, the MMO compound is in the form of a solid solution. In another embodiment, the MMO is an HTLP compound. In one embodiment, the MMO compound is used per se as the additive for increasing the performance of FCC catalysts. In one embodiment, the MMO compound is in the form of a shaped body. In one embodiment, the shaped bodies are dried, calcined or a mixture thereof.

In another embodiment, the invention provides methods for increasing the performance of FCC catalysts by utilizing one or more shaped bodies comprising MMO compounds to the FCC catalyst. In one embodiment, the MMO compound is a magnesium aluminate compound. In another embodiment, the MMO compound is in the form of a solid solution. In another embodiment, the MMO is an HTLP compound. In one embodiment, the shaped bodies are dried, calcined or a mixture thereof.

In another embodiment, the invention provides methods for increasing the performance of FCC catalysts by adding one or more shaped bodies comprising MMO compounds and a support to the FCC catalyst. In one embodiment, the MMO compound is a magnesium aluminate compound. In another embodiment, the MMO compound is in the form of a solid solution. In another embodiment, the MMO is an HTLP compound. In one embodiment, the support is a spinel, HTL compound, magnesium acetate, magnesium nitrate, magnesium chloride, magnesium hydroxide, magnesium carbonate, magnesium formate, aluminum titanate, zinc titanate, zinc aluminate, zinc titanate/zinc aluminate, aluminum zirconate, calcium oxide, calcium aluminate, aluminum nitrohydrate, aluminum hydroxide compound, aluminum-containing metal oxide compound (e.g., other than alumina or aluminum hydroxide compounds), aluminum chlorohydrate, titania, zirconia, clay (e.g., halloysite, rectorite, hectorite, montmorillinite, synthetic montmorillinite, sepiolite, activated sepiolite, kaolin), clay phosphate material, zeolite, or a mixture of two or more thereof. In one embodiment, the shaped bodies are dried, calcined or a mixture thereof.

In one embodiment, the solid support is present in an amount up to about 50% by weight; from about 1% by weight to about 30% by weight; from about 1% by weight to about 20% by weight; from about 1% by weight to about 15% by weight; from about 1% by weight to about 10% by weight; or from about 1% by weight to about 5% by weight.

Any conventional feedstock can be used in the FCC unit. The feedstock may range from the typical, such as petroleum distillates or residual stocks, either virgin or partially refined, to the atypical, such as coal oils and shale oils. The feedstock frequently will contain recycled hydrocarbons, such as light and heavy cycle oils which have already been subjected to cracking. Preferred feedstocks are gas oils, vacuum gas oils, atmospheric resids, and vacuum resids.

Any commercially available FCC catalyst may be used. The catalyst can be 100% amorphous, but preferably includes some zeolite in a porous refractory matrix such as silica-alumina, clay, or the like. The zeolite is usually about 5 to about 40%, by weight, of the catalyst, with the rest being matrix. Conventional zeolites such as Y zeolites, or aluminum deficient forms of these zeolites, such as dealuminized Y, ultrastable Y, and ultrahydrophobic Y may be used. The zeolites may be stabilized with rare earths, for example, in an amount of about 0.1 to about 10 weight %. Relatively high silica zeolite containing catalysts can be used in the invention. They withstand the high temperatures usually associated with complete combustion of CO to $CO_2$ within the FCC regenerator. Such catalysts include those containing about 10 to about 40% ultrastable Y or rare earth ultrastable Y.

The catalyst inventory may also contain one or more additives, either present as separate additive particles, or mixed in with each particle of the cracking catalyst. Additives can be added to enhance octane, such as medium pore size zeolites, e.g., ZSM-5 and other materials having a similar crystal structure.

Conventional riser cracking conditions may be used. Typical riser cracking reaction conditions include catalyst/oil ratios of about 0.5:1 to about 15:1, a catalyst contact time of about 0.1 to about 50 seconds, and riser top temperatures of about 900 to about 1050° F. It is important to have good mixing of feedstock with catalyst in the base of the riser reactor. This can be accomplished by use conventional techniques such as adding large amounts of atomizing steam, use of multiple nozzles, use of atomizing nozzles and similar technology. The base of the riser may comprise a riser catalyst acceleration zone. In one embodiment, riser reactor discharges into a closed cyclone system for rapid and efficient separation of cracked products from spent catalyst.

The compounds, compositions and/or shaped bodies of the invention can be made by the methods described in U.S. Pat. No. 6,028,023. In one embodiment, the compounds, compositions and shaped bodies are made by the following process:

(a) reacting a mixture comprising at least one divalent metal compound and at least one trivalent metal compound to produce a slurry;

(b) heat treating the slurry from step (a) at a temperature up to about 225° C.;

(c) drying the heat-treated compound from step (b) to produce one or more shaped bodies; and, optionally, (d) heat treating the compound from step (c) at a temperature of about 300° C. or higher to produce one or more calcined shaped bodies of a MMO compound.

In one embodiment, the mixture is an aqueous mixture and the slurry is an aqueous slurry.

Steps (a)-(d) can be conducted in a continuous and/or batch wise manner. The terms "aqueous slurry" and "slurry" include, for example, sol solutions, gels and pastes. In the methods of making the shaped bodies of the mixed metal oxide compounds of the invention, a solvent can optionally be added to the slurry before, during, or after the heat treatment of step (b). The solvent can be, for example, acetic acid, propionic acid, formic acid, butyric acid, valeric acid, nitric acid, ammonium hydroxide, water, and the like, or a mixture of two or more thereof. In one embodiment, the solvent is acetic acid.

The divalent metal cation in the divalent metal compound can be, for example, $Mg^{2+}$, $Ca^{2+}$, $Zn^{2+}$, $Mn^{2+}$, $Co^{2+}$, $Ni^{2+}$, $Sr^{2+}$, $Ba^{2+}$, $Cu^{2+}$ or a mixture of two or more thereof. In one embodiment, the divalent metal cation is $Mg^{2+}$. Divalent metal compounds are well known in the art. Exemplary divalent metal compounds containing $Mg^{2+}$ include magnesium oxide, magnesium hydroxy acetate, magnesium acetate, magnesium hydroxide, magnesium nitrate, magnesium carbonate, magnesium formate, magnesium chloride, magnesium aluminate, hydrous magnesium silicate, magnesium calcium silicate, magnesium-containing clays (e.g., dolomite, saponite, sepiolite), or a mixture of two or more thereof.

The trivalent metal cation in the trivalent metal compound can be, for example, $Al^{3+}$, $Mn^{3+}$, $Fe^{3+}$, $Co^{3+}$, $Ni^{3+}$, $Cr^{3+}$, $Ga^{3+}$, $B^{3+}$, $La^{3+}$, $Gl^{3+}$ or a mixture of two or more thereof. In one embodiment, the trivalent metal cation is $Al^{3+}$. Trivalent metal compounds are well known in the art. Exemplary trivalent metal compounds containing $Al^{3+}$ include aluminum hydroxide hydrate, aluminum oxide, aluminum acetate, aluminum nitrate, aluminum hydroxide, aluminum carbonate, aluminum formate, aluminum chloride, hydrous aluminum silicate, aluminum calcium silicate, transition alumina, aluminum trihydrate (e.g., gibbsite, bayerite, calcined alumina) alumina sols, amorphous alumina, pseudoboehmite (sols, gels, slurries), aluminum-containing clays (e.g., kaolin, sepiolite, hydrotalcite, bentonite, metakaolin), sodium aluminate, or a mixture of two or more thereof.

In the MMO compounds of the invention, the ratio of the divalent metal cation (e.g., $Mg^{2+}$) to the trivalent metal cation (e.g., $Al^{3+}$) can be from about 0.6:1 to about 10:1; from about 1.1:1 to about 6:1; about 1.2:1 to about 5:1; about 1.3:1 to about 5:1; about 1.4:1 to about 5:1; about 1.5:1 to about 5:1; about 1.6:1 to about 5:1; about 1.7:1 to about 5:1; about 1.8:1 to about 5:1; about 1.9:1 to about 5:1; or about 2:1 to about 5:1.

Prior to step (a), the divalent metal compound can be prepared in the form of a slurry, and the trivalent metal compound can be prepared in the form of a slurry. The divalent metal compound and the trivalent metal compound can be separately prepared in the form of a slurry, and then mixed together; or a mixture containing the divalent metal compound and the trivalent metal compound can be prepared by simultaneously or concurrently mixing the compounds together in the form of a slurry.

In one embodiment, the aqueous reaction mixture in step (a) can further comprise one or more other metal components such as metals of antimony, bismuth, cadmium, calcium, cerium, chromium, cobalt, copper, dysoprosium, erbium, europium, gadolinium, germanium, gold, holmium, iridium, iron, lanthanum, lead, magnesium, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. The metals can be in an elemental state and/or can be in the form of metal oxides, metal sulfides, metal halides, or a mixture of two or more thereof. In one embodiment, the aqueous reaction mixture further comprises copper (e.g., CuO), cobalt (e.g., CoO), vanadium (e.g., $V_2O_5$), titanium ($TiO_2$), lanthanum ($La_2O_3$), cerium (e.g., $CeO_2$), tungsten, or a mixture of two or more thereof. In another embodiment, the aqueous reaction mixture further comprises copper (e.g., CuO), cobalt (CoO), vanadium (e.g., $V_2O_5$), cerium (e.g., $CeO_2$), or a mixture of two or more thereof. The one or more metal components (or oxides, sulfides, and/or halides thereof) can be present in the aqueous reaction mixture in an amount up to about 40% by weight; or from about 1% to about 25% by weight; or from about 2% to about 20% by weight, calculated as the oxide equivalent. The one or more other metal components can be added to the aqueous reaction mixture at the same time as the at least one divalent metal compound and the at least one trivalent metal compound are being mixed together to form the aqueous slurry.

Step (b) of heat treating the aqueous slurry can be conducted by heat treating the aqueous slurry at a temperature of about 50° C. to less than about 225° C.; at a temperature of about 60° C. to about 200° C.; at a temperature of about 70° C. to about 150° C.; at a temperature of about 75° C. about 100° C.; or at a temperature of about 80° C. to about 85° C. The low temperature heat treating step can be conducted for about 10 minutes to about 24 hours or more. The low temperature heat treatment is generally conducted in air or an inert atmosphere, and at atmospheric pressures. In one embodiment, the step of low temperature heat treatment is accomplished using steam injection, jacketing, heat coils, and/or autoclave. The low temperature heat treatment does not result in a dry compound; instead, is in the form of a heat-treated, aqueous slurry.

In another embodiment, the one or more other metal components (e.g., metals, oxides, sulfides and/or halides of antimony, bismuth, cadmium, calcium, cerium, chromium, cobalt, copper, dysoprosium, erbium, europium, gadolinium, germanium, gold, holmium, iridium, iron, lanthanum, lead, magnesium, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof) can be added to the aqueous slurry before, during and/or after step (b).

After conducting the low temperature heat treatment, the heat-treated, aqueous slurry is dried. The drying step (c) can be accomplished by, for example, spray drying, drum drying, flash drying, tunnel drying, and the like. In one embodiment, the drying step is accomplished by spray drying. Upon drying, the MMO compound can be in the form of shaped bodies (e.g., particles, grains, pellets, powders, extrudate, spheres, granules, and mixtures of two or more thereof). The drying step is useful to create shaped bodies having particular shapes of interest. The dried MMO compounds described herein can be used in an FCC unit to mitigate the deleterious effect of metals on FCC catalysts.

Step (d) can also be conducted at a temperature greater than about 300° C.; or about 300° C. to about 850° C.; or about 400° C. to about 500° C. In other embodiments, step (d) is conducted at a temperature from about 300° C. to about 850° C.; or about 500° C. to about 850° C.; or about 550° C. to about 850° C.; or about 600° C. to about 850° C. The high temperature heat treatment is generally conducted in air at atmospheric pressures. The high temperature heat treatment step can be conducted for about 10 minutes to about 24 hours or more; from about 1 hour to about 18 hours; or from about 1 hour to about 10 hours. The high temperature heat treatment step can be conducted in air, in an inert environment, in an oxidizing environment (e.g., higher concentrations of oxygen than that found in "normal" air), or in a reducing environment. In one embodiment, the high temperature heat treatment step is conducted in air. The calcined MMO compounds described herein can be used in an FCC unit to mitigate the deleterious effect of metals on FCC catalysts.

The dried and/or calcined shaped bodies comprising MMO compounds generally have an attrition less than about 4; less than about 3; less than about 2.5; less than about 2.4; less than about 2.3; less than about 2.2; less than about 2.1; less than about 2; less than about 1.9; less than about 1.8; less than about 1.7; less than about 1.6; or less than about 1.5. In other embodiments, the attrition of the mixed metal oxide can be less than about 1.4; less than about 1.3; less than about 1.2; less than about 1.1; less than about 1.0; less than about 0.9; less than about 0.8; or less than about 0.7. The attrition of the MMO compounds is measured by the ASTM D5757 method between the first and second hours or between the first and fifth hours.

In one embodiment, the MMO is a solid solution magnesium aluminate comprising Mg and Al in a ratio of about 0.6:1 to about 6:1, wherein the calcined form of the solid solution magnesium aluminate has an X-ray diffraction pattern displaying at least a reflection at a 2-theta peak position at about 43 degrees and about 62 degrees. In other embodiments, the ratio of Mg to Al is about 1.1:1 to about 6:1; about 1.2:1 to about 5:1; about 1.3:1 to about 5:1; about 1.4:1 to about 5:1; about 1.5:1 to about 5:1; about 1.6:1 to about 5:1; about 1.7:1 to about 5:1; about 1.8:1 to about 5:1; about 1.9:1 to about 5:1; or about 2:1 to about 5:1. The solid solution can be in the form of a slurry, dried shaped bodies and/or calcined shaped bodies. The solid solution can be used in the methods described herein by itself or the solid solution can be used in a composition that contains other components (e.g., metallic oxidants and/or supports).

The shaped bodies can comprise the solid solution magnesium aluminate, one or more metallic oxidants, and, optionally, a support; where the metal in the metallic oxidant is antimony, bismuth, cadmium, calcium, cerium, chromium, cobalt, copper, dysoprosium, erbium, europium, gadolinium, germanium, gold, holmium, iridium, iron, lanthanum, lead, magnesium, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. In one embodiment, the composition comprises copper (e.g., CuO), cobalt (e.g., CoO), vanadium (e.g., $V_2O_5$), titanium ($TiO_2$), lanthanum ($La_2O_3$), cerium (e.g., $CeO_2$), tungsten, or a mixture of two or more thereof. In another embodiment, the composition comprises copper (e.g., CuO), cobalt (CoO), vanadium (e.g., $V_2O_5$), cerium (e.g., $CeO_2$), or a mixture of two or more thereof. In another embodiment, the composition comprises copper (e.g., CuO) and/or cobalt (CoO). In another embodiment, the composition comprises vanadium (e.g., $V_2O_5$) and/or cerium (e.g., $CeO_2$). The support can be a spinel and/or a HTL compound.

In this embodiment of the invention, the shaped bodies can be made following the methods described in U.S. Pat. No. 6,028,023, where a HTL compound is added during step (a) described above; before, during and/or after step (b) described above; and/or before, during and/or after step (c) described above.

HTL compounds are characterized by structures having positively charged layers that are separated by interstitial anions and/or water molecules. Exemplary natural minerals that are HTL compounds include meixnerite, pyroaurite, sjogrenite, hydrotalcite, stichtite, reevesite, eardleyite, mannaseite, barbertonite and hydrocalumite. Other HTL compounds and methods for making them are described by Cavani et al, *Catalysis Today*, 11:173-301 (1991), the disclosure of which is incorporated by reference herein in its entirety.

In other embodiments, the HTL compound can be a compound of formula (I), (II), (III) and/or (IV):

$$(X^{2+}{}_m Y^{3+}{}_n (OH)_{2m+2n}) A_{n/a}{}^{a-} \cdot b H_2O \quad (I)$$

$$(Mg^{2+}{}_m Al^{3+}{}_n (OH)_{2m+2n}) A_{n/a}{}^{a-} \cdot b H_2O \quad (II)$$

$$(X^{2+}{}_m Y^{3+}{}_n (OH)_{2m+2n}) OH_n{}^- \cdot b H_2O \quad (III)$$

$$(Mg^{2+}{}_m Al^{3+}{}_n (OH)_{2m+2n}) OH_n{}^- \cdot b H_2O \quad (IV)$$

where X is magnesium, calcium, zinc, manganese, cobalt, nickel, strontium, barium, copper or a mixture of two or more thereof; Y is aluminum, manganese, iron, cobalt, nickel, chromium, gallium, boron, lanthanum, cerium or a mixture of two or more thereof; A is $CO_3$, $NO_3$, $SO_4$, Cl, OH, Cr, I, $SiO_3$, $HPO_3$, $MnO_4$, $HGaO_3$, $HVO_4$, $ClO_4$, $BO_3$ or a mixture of two or more thereof; a is 1, 2 or 3; b is between 0 and 10; and m and n are selected so that the ratio of m/n is about 1 to about 10.

In one embodiment, the HTL compound is hydrotalcite, i.e., $Mg_6Al_2(OH)_{16}CO_3 \cdot 4H_2O$. In another embodiment, the HTL compound is $Mg_6Al_2(OH)_{18} \cdot 4.5H_2O$.

The shaped bodies of the invention can comprise a support. Exemplary supports include spinels, HTL compounds, magnesium acetate, magnesium nitrate, magnesium chloride, magnesium hydroxide, magnesium carbonate, magnesium formate, aluminum titanate, zinc titanate, aluminum zirconate, calcium oxide, calcium aluminate, aluminum nitrohydrate, aluminum hydroxide compounds, aluminum-containing metal oxide compound (e.g., other than alumina or aluminum hydroxide compounds), aluminum chlorohydrate, titania, zirconia, clay (e.g., halloysite, rectorite, hectorite, montmorillinite, synthetic montmorillinite, sepiolite, activated sepiolite, kaolin), clay phosphate material, zeolite, or a mixture of two or more thereof. In one embodiment, the support is zinc titanate, zinc aluminate, or zinc titanate/zinc aluminate. Methods for making such compositions are described, for example, in WO99/42201, the disclosure of which is incorporated by reference herein in its entirety.

In another embodiment, the invention provides methods for improving FCC catalyst performance from a fluid catalytic cracking unit by adding the shaped bodies described herein to an FCC unit. In one embodiment, the shaped bodies are added to the regenerator of the FCC unit.

The shaped bodies of the invention can be added to any conventional reactor-regenerator systems, to ebullating catalyst bed systems, to systems which involve continuously conveying or circulating catalysts/additives between reaction zone and regeneration zone and the like. In one embodiment, the FCC unit comprises circulating bed systems. Typical of the circulating bed systems are the conventional moving bed and fluidized bed reactor-regenerator systems. Both of these circulating bed systems are conventionally used in hydrocarbon conversion (e.g., hydrocarbon cracking) operations. In another embodiment, the circulating bed system is a fluidized catalyst bed reactor-regenerator system.

EXAMPLES

The following examples are for purposes of illustration only and are not intended to limit the scope of the claims appended hereto.

Example 1

Preparation of Mixed Metal Oxide (MMO) Additives

Magnesium aluminate compounds that are HTLP compounds were prepared following the methods described herein and in U.S. Pat. No. 6,028,023, the disclosure of which is incorporated by reference herein in its entirety.

MgO powder (having a surface area of about 100 m$^2$/g) (MAGOX®, Premier Chemicals, Cleveland, Ohio) was slurried in water at a solids level of about 14.7%. Thereafter, approximately 19 parts MgO slurry was mixed with one part technical grade acetic acid to create an acidified MgO slurry.

Separately, pseudoboehmite (Sasol Sol P2®) was dispersed in water at a solids level of about 8% to produce an alumina sol.

The acidified MgO slurry and alumina sol were mixed in a container such that the molar ratio of Mg to Al of the preparation was 4:1. Additional water was added to the mixture to adjust the solids content of the mixture to about 9.3%. The mixture was heated to about 214° F. over a period of about 5 hours. 4% of a 15% solution of oxalic acid in water was added to the slurry along with additional water necessary to maintain a slurry viscosity capable of being spray dried. The mixture was then spray dried (i.e., at a temperature of about 380° C. at the inlet and about 110° C. at the outlet). The substance was then calcined at a temperature of about 600° C. for 1 hour to form the MMO. The XRD pattern thereof is shown in FIG. 1.

Figure 2:
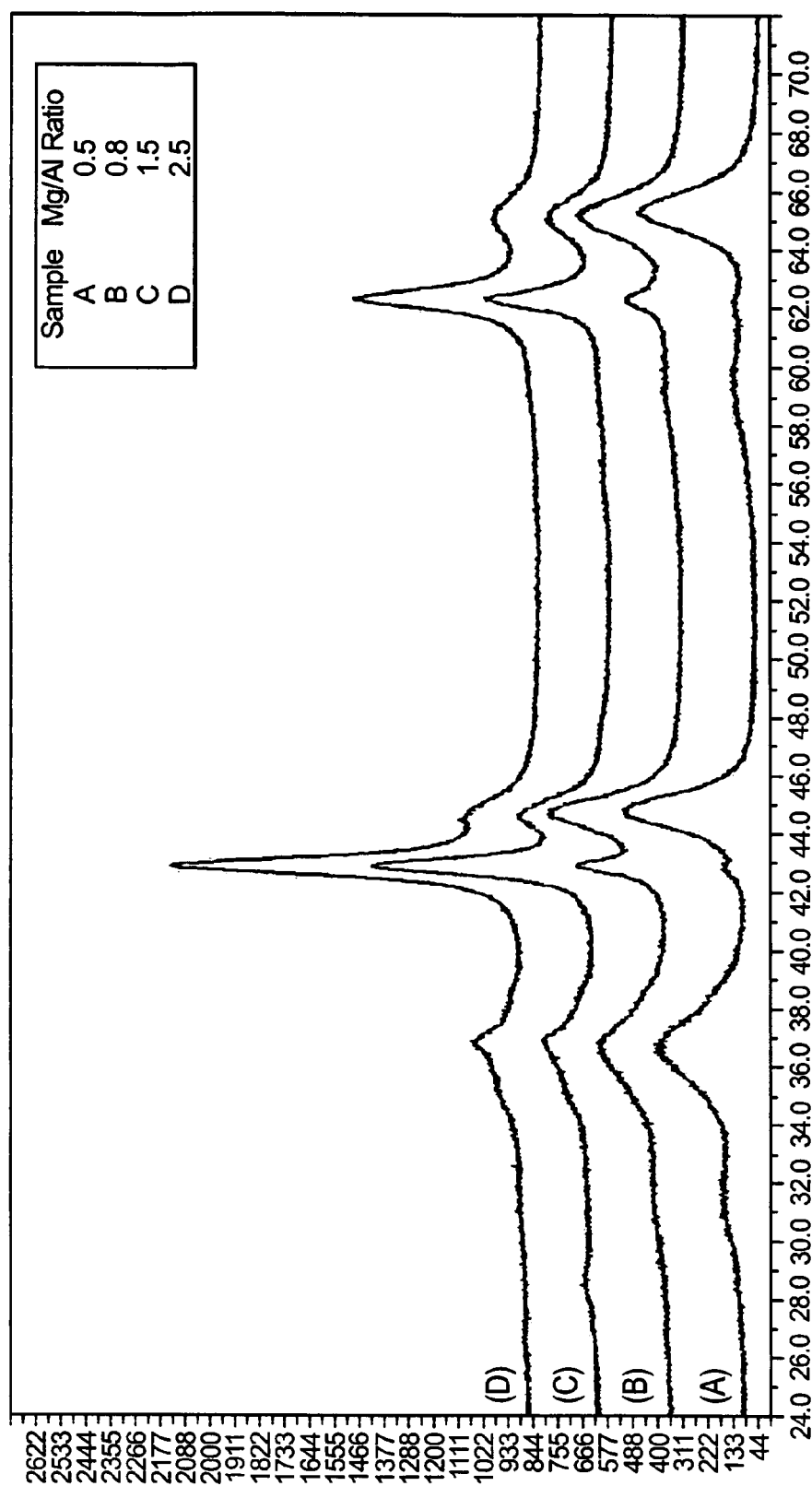
FIG. 2 shows the XRD patterns for calcined magnesium aluminate compounds that are MMO compounds. These MMO compounds have Mg to Al ratios, from top to bottom, of 2.5:1, 1.5:1, 0.8:1 and 0.5:1.

The ratio of Mg to Al can be varied in making the MMO compound. FIG. 2 shows the XRD patterns of similar MMO compounds with Mg to Al ratios, from top to bottom, of 2.5:1, 1.5:1, 0.8:1, and 0.5:1.

Example 2

Preparation of MMO Additives

MMO additives, made up of not only MgO and alumina sol (making an HTLP compound), but also with additional metal components, were prepared.

As described in Example 1, an MgO slurry/alumina sol mixture was prepared with a Mg to Al ratio of 4:1. In a manner similar to Example 1, MMO additives were prepared with this MgO slurry/alumina sol mixture. Prior to spray drying, an additional metal oxide was added.

Figure 3:
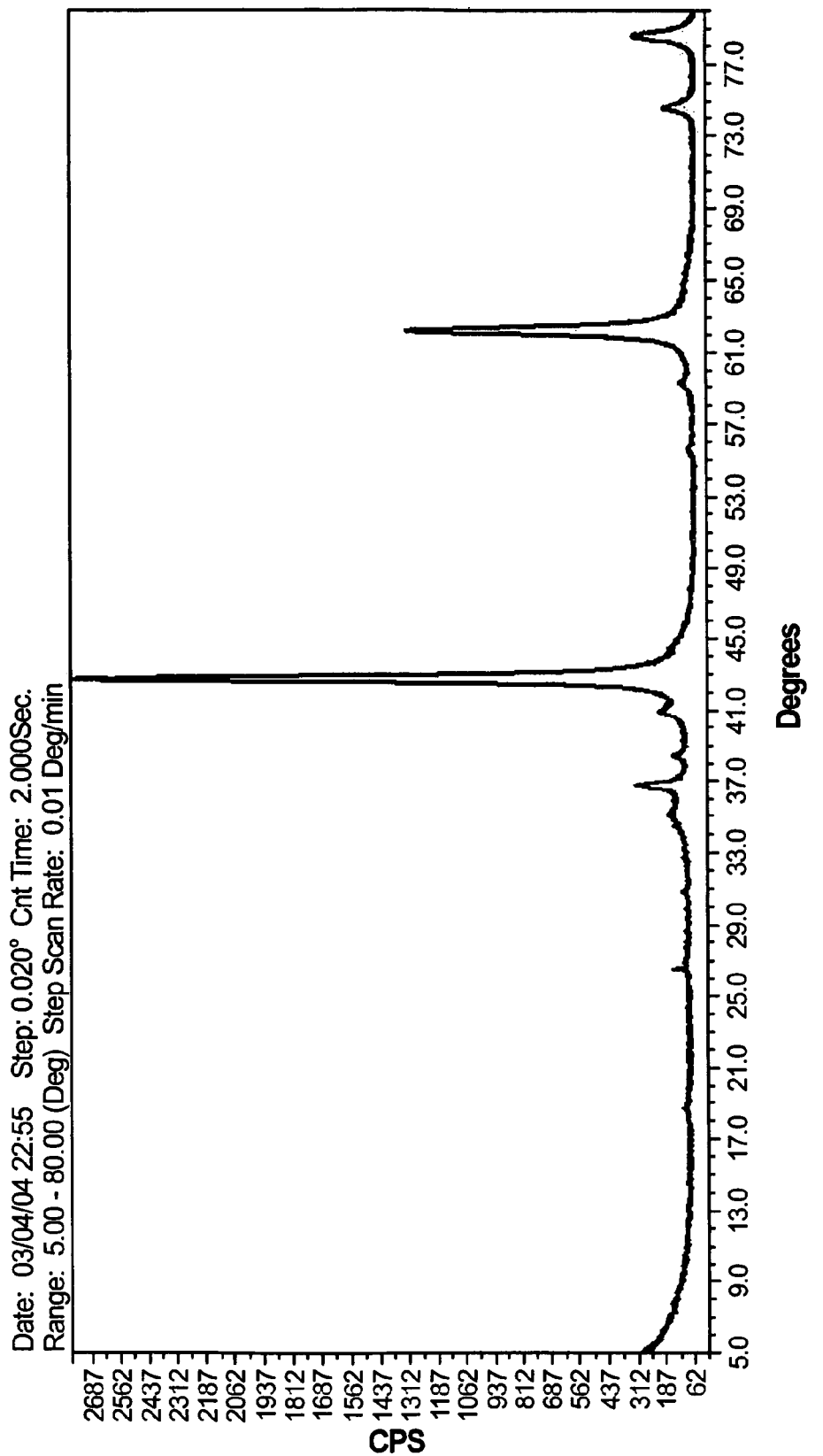
FIG. 3 shows the XRD pattern for a calcined HTLP/metal component compound that is an MMO compound.

CaO could be added as the additional metal component. If CaO is added so that the solids content of the compound was about 10% CaO, a HTLP/10% CaO MMO is produced. The XRD pattern for this HTLP/metal oxide, which is an MMO, is shown in FIG. 3.

Figure 4:
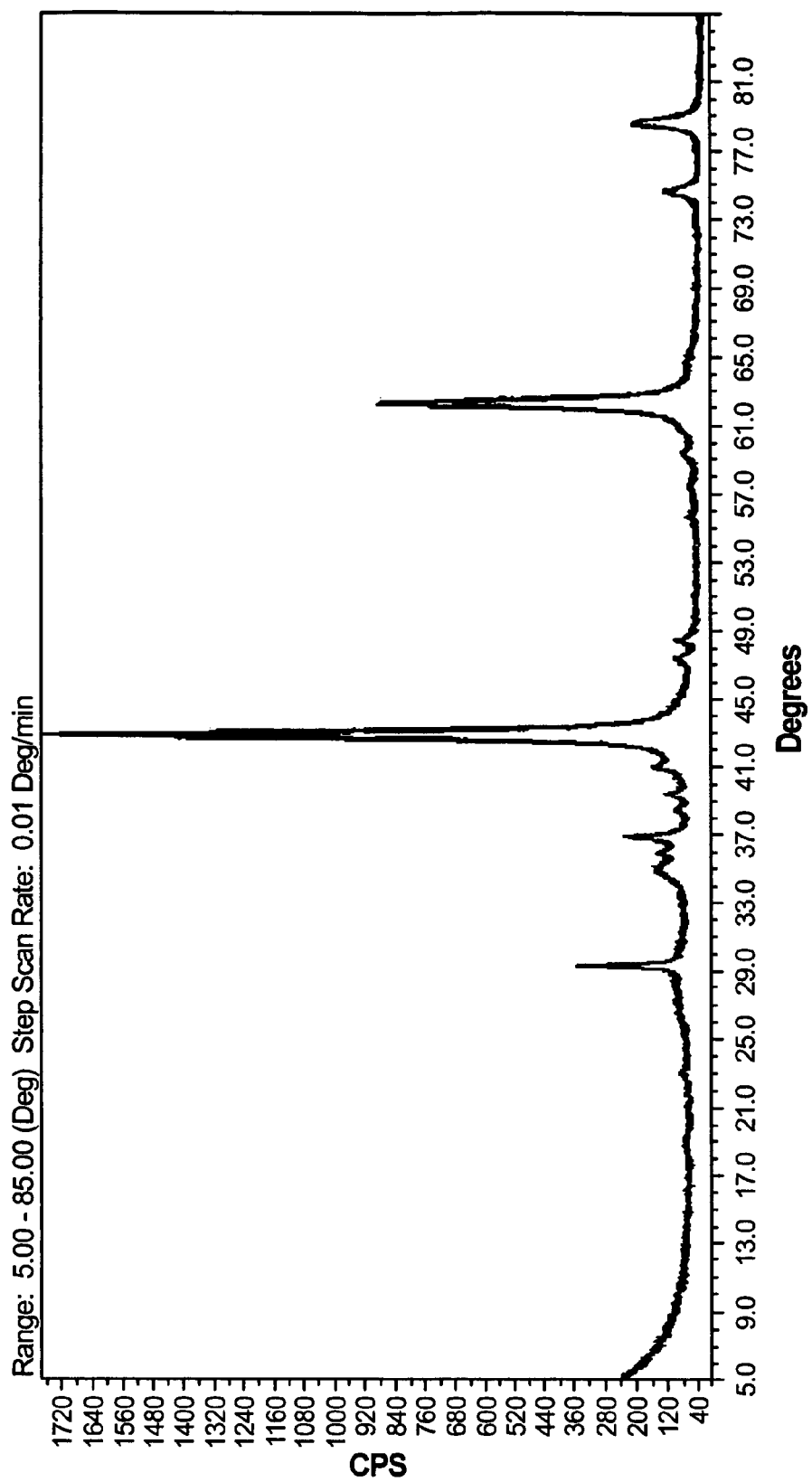
FIG. 4 shows the XRD pattern for a calcined HTLP/metal component that is an MMO compound.

$Ca(OH)_2$, $CaCO_3$, MgO, $Mg(OH)_2$, $MgCO_3$ and other calcium and magnesium-containing compounds may also be used as the additional metal component. The quantity of additional metal component in the MMO mixture can vary from 0% to about 40% of the solids content of the final MMO compound. The percentage of each additional metal component is calculated on the loss-free basis of its simple oxide basis (i.e. MgO, CaO). The XRD pattern for an HTLP/10% $Mg(OH)_2$ MMO is shown in FIG. 4.

The MMO additives of Test Runs B to F and H of the present invention were prepared in this manner.

Alternatively, in the preparation of the MMO compound, the additional metal component may be added before the slurry is heated prior to being spray dried.

Example 3

Improved FCC Catalyst Performance

To evaluate the performance of MMO additives, feedstock was catalytically cracked under FCC reactor-like conditions with various Y-zeolite cracking catalyst/MMO additive combinations. The Y-zeolite cracking catalyst of Examples 3-5 was formulated with 25% Y-zeolite in an active matrix of pseudoboehmite alumina and silica sol.

Figure 5:
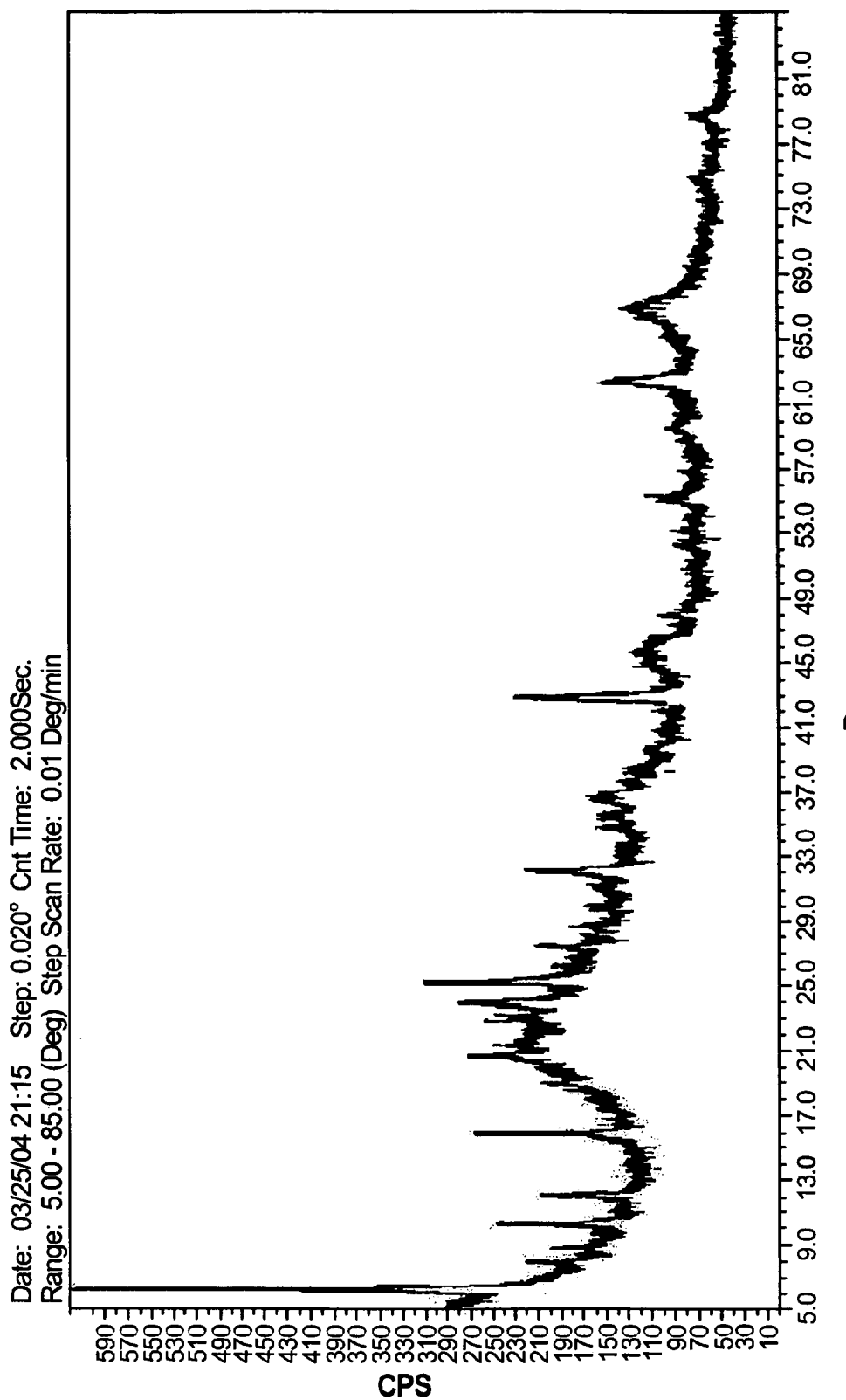
FIG. 5 shows the XRD pattern for a metallized FCC catalyst/MMO additive mixture.

Each catalyst mixture (with and without MMO additives) was first calcined individually at 732° C. for one hour and then deactivated according to protocol. V and Ni naphthenates were cracked onto each specific catalyst mixture using a commercially available automated deactivation unit (Kayser Technologies Model D-100). Then the metal contaminated catalyst mixture was steam treated at 800° C. with about 50% steam for 11 hours. The catalyst mixture had a final V concentration of about 9500 ppm and Ni concentration of about 750 ppm. An XRD pattern of the deactivated catalyst/additive mixture is shown in FIG. 5. In addition to the peaks of Y-zeolite catalyst, peaks from the MMO additive are present at about 43 and 62 degrees two-theta.

This deactivated catalyst mixture is then loaded into a commercially available, laboratory-scale FCC test unit (Kayser Technology ACE model R+).

For this example, four FCC Test Runs (A to D) were carried out with varying MMO additives to demonstrate the improved catalytic cracking performance of the present invention.

In Test Run A, no metal passivating additive was used. Test Runs B to D used MMO additives of the present invention that were prepared in a manner similar to Example 1 or 2. Test Runs B to D used HTLP compounds with a Mg to Al ratio of 4:1. Test Run B used an HTLP MMO additive. Test Run C used an HTLP/20% Ca(OH)$_2$ MMO additive. Test Run D used an HTLP/20% CaCO$_3$ MMO additive. Performance results are given in Table 1, below. All data is given as weight percentages.

TABLE 1

Improved FCC Catalyst Performance Results

| Test Run | MMO Additive | Conversion (%) | LPG (C3 + C4) Yield | Gasoline Yield (%) | LCO Yield (%) | Bottoms Yield (%) | Coke Yield (%) | H-Gas Yield (%) |
|---|---|---|---|---|---|---|---|---|
| A | None | 67.6 | 16.9 | 35.2 | 20.6 | 11.8 | 12.0 | 0.97 |
| B | HTLP | 73.4 | 20.1 | 39.6 | 17.7 | 8.9 | 10.5 | 0.67 |
| C | HTLP/20% Ca(OH)$_2$ | 77.1 | 22.9 | 43.1 | 16.2 | 6.7 | 8.1 | 0.45 |
| D | HTLP/20% CaCO$_3$ | 76.6 | 22.4 | 42.2 | 16.6 | 6.9 | 8.9 | 0.54 |

The results reported in Table 1 show that the present invention increases the conversion of feedstock into useful fractions. The results also show that the MMO additives increase the yield of gasoline and LPG, while decreasing the yield of LCO and bottoms. In addition, the MMO additives decrease the amount of coke deposited on the FCC catalyst and decrease the amount of hydrogen gas produced.

Example 4

Mitigate Loss of Catalyst Crystallinity

To further evaluate the performance of the instant invention, XRD and surface area measurements were taken of FCC catalysts that had been mixed with various additives and then deactivated.

In Test Run A, no MMO additive was used. Test Runs B, D, E, and F used MMO additives of the present invention. Test Run B used an HTLP MMO additive. Test Run E used an HTLP/10% Ca(OH)$_2$ MMO additive. Test Run D used an HTLP/20% CaCO$_3$ MMO additive. Test Run F was fresh catalyst that was steamed but not metallized. The results are given in Table 2, below.

TABLE 2

Improved FCC Catalyst Characteristics

| Test Run | Additive Used | Relative Peak (6.3° 2-θ) Height | Surface Area (m$^2$/g) |
|---|---|---|---|
| A | None | 1.0 | 71 |
| B | HTLP | 3.9 | 97 |
| E | HTLP/10% Ca(OH)$_2$ | 5.4 | 118 |
| D | HTLP/20% CaCO$_3$ | 7.4 | 114 |
| F | Fresh Catalyst (No Metallization) | 30 | 160 |

The results reported in Table 2 show that the present invention increases the height of the XRD pattern peak at about 6.3 degrees 2-theta. The height of this XRD pattern peak is a metric that indicates the degree of crystallinity of the FCC catalyst. The higher the peak height, the more crytalline the catalyst. Surface area of the catalyst is another indicator of crystallinity. The results also show that the reduction of the surface area of the FCC catalyst is decreased by the present invention.

Example 5

Increase Octane Rating of Gasoline

To further evaluate the performance of the instant invention, the octane rating of gasoline produced in FCC runs, with and without the use of MMO additives, was measured.

FCC catalyst was metallized as in Example 3. Feedstock was catalytically cracked under FCC reactor-like conditions. In Test Run A, no metal passivating additive was used. Test Run B used an HTLP additive. Test Run C used an HTLP/20% Ca(OH)$_2$ MMO additive. Test Run D used an HTLP/20% CaCO$_3$ MMO additive. The gasoline was analyzed on a PONA-GC and the octane rating was subsequently determined by correlation. The results are given in Table 3, below.

TABLE 3

Improved Octane Rating of Gasoline

| Test Run | Additive Used | Total RON | Total MON | (R + M)/2 |
|---|---|---|---|---|
| A | None | 81.8 | 75.0 | 78.4 |
| B | HTLP | 85.2 | 78.3 | 81.8 |
| C | HTLP/20% Ca(OH)$_2$ | 86.8 | 79.5 | 83.1 |
| D | HTLP/20% CaCO$_3$ | 86.7 | 79.3 | 83.0 |

The results reported in Table 3 show that the present invention not only increases the conversion of feedstock and the production of gasoline, but also increases the octane rating of the produced gasoline.

Example 6

Decrease Sulfur Levels in Gasoline

To further evaluate the performance of the instant invention, the sulfur levels of gasoline produced in FCC runs, with and without the use of MMO additives, was measured. The Y-zeolite cracking catalyst used in Test Runs G and H is a commercially available grade Engelhard NapthaMax.

Cracking catalyst was metallized as in Example 3. Feedstock was catalytically cracked under FCC reactor-like conditions. In Test Run G, no metal passivating additive was used. Test Run H used an HTLP/10% CaO MMO additive. The gasoline was analyzed on a GC-AED technique. The results are given in Table 4, below.

TABLE 4

Decreased Sulfur Levels of Gasoline

| Test Run | Additive Used | Conversion (%) | Gasoline Yield (%) | S Concentration (ppm) |
|---|---|---|---|---|
| G | None | 67.2 | 42.3 | 219 |
| H | HTLP/10% CaO | 77.2 | 48 | 178 |

The results reported in Table 4 show that the present invention not only increases the conversion of feedstock and the production of gasoline, but also decreases the concentration of sulfur in the produced gasoline.

Example 7

Metal Trapping

Scanning Electron Microscopy utilizing Energy Dispensive Spectroscopy (SEM/EDS) was performed on the MMO additives used in Example 3, above.

FCC catalyst/MMO additive mixtures were deactivated by being metallized and steamed as described in Example 3. The additive particles were found to contain one or more of the following elements: cerium, copper, iron, lanthanium, nickel, phosphorous, silica, sodium, sulfur, and/or vanadium. For example, HTLP/10% CaO MMO additives of Example 3 were found to pick up at least Ce, Fe, La, Na, Ni, P, S, Si, and V.

Various modifications of the invention, in addition to those described herein, will be apparent to one skilled in the art from the foregoing description. Such modifications are understood to fall within the scope of the appended claims.

What is claimed is:

1. A method of increasing the performance of a fluid catalytic cracking (FCC) catalyst in the presence of at least one metal comprising:
    contacting a fluid stream from an FCC unit comprising the fluid catalytic cracking catalyst with a compound comprising magnesium and aluminum, and having an X-ray diffraction pattern displaying at least a reflection at a 2-theta peak position at about 43 degrees and about 62 degrees, wherein the ratio of magnesium to aluminum in the compound is from about 0.6:1 to about 10:1, and wherein the compound has not been derived from a hydrotalcite compounds.

2. The method of claim 1, wherein the compound increases the catalytic conversion of a feedstock.

3. The method of claim 1, wherein the compound increases gasoline production from a feedstock.

4. The method of claim 1, wherein the compound increases LPG production from a feedstock.

5. The method of claim 1, wherein the compound decreases LCO production from a feedstock.

6. The method of claim 1, wherein the compound decreases the bottoms production from a feedstock.

7. The method of claim 1, wherein the compound decreases the coke production from a feedstock.

8. The method of claim 1, wherein the compound decreases the hydrogen gas production from a feedstock.

9. The method of claim 1, wherein the compound increases the octane rating of gasoline produced from a feedstock.

10. The method of claim 1, wherein the compound decreases the sulfur content of gasoline produced from a feedstock.

11. The method of claim 1, wherein the compound mitigates the decrease in FCC catalyst crystallinity caused by a metal.

12. The method of claim 11, wherein the FCC catalyst comprises Y-faujasite zeolite.

13. The method of claim 1, wherein the compound mitigates the reduction, caused by a metal, in the height/intensity of the 2-theta peak at 6.3 degrees for an X-ray power diffraction of a zeolite in the FCC catalyst.

14. The method of claim 1, wherein the compound mitigates the reduction in the surface area of a zeolite in the FCC catalyst.

15. The method of claim 1, wherein the compound comprises an additional metal component.

16. The method of claim 15, wherein the compound increases the catalytic conversion of a feedstock.

17. The method of claim 15, wherein the compound increases the gasoline production from a feedstock.

18. The method of claim 15, wherein the compound increases the LPG production from a feedstock.

19. The method of claim 15, wherein the compound decreases the LCO production from a feedstock.

20. The method of claim 15, wherein the compound decreases the bottoms production from a feedstock.

21. The method of claim 15, wherein the compound decreases the coke production from a feedstock.

22. The method of claim 15, wherein the compound decreases the hydrogen gas production from a feedstock.

23. The method of claim 15, wherein the compound increases the octane rating of gasoline produced from a feedstock.

24. The method of claim 15, wherein the compound decreases the sulfur content of gasoline produced from a feedstock.

25. The method of claim 15, wherein the compound mitigates the decrease in FCC catalyst crystallinity caused by a metal.

26. The method of claim 15, wherein the FCC catalyst comprises Y-faujasite zeolite.

27. The method of claim 15 wherein the compound mitigates the reduction, caused by a metal, in the height/intensity of the 2-theta peak at 6.3 degrees for an X-ray power diffraction of a zeolite in the FCC catalyst.

28. The method of claim 15, wherein the compound mitigates the reduction in the surface area of a zeolite in the FCC catalyst.

29. The method of claim 1, wherein the compound passivates at least one metal found in the mixture of compounds present in an FCC run, wherein the metal is cerium, copper, iron, lanthanium, nickel, phosphorus, silica, sodium, sulfur, vanadium, or a mixture of two or more thereof.

30. The method of claim 15, wherein the compound passivates at least one metal found in the feedstock or cracking catalyst, wherein the metal is cerium, copper, iron, lanthanium, nickel, phosphorus, silica, sodium, sulfur, vanadium, or a mixture of two or more thereof.

31. The method of claim 1, wherein substantially no binder is used.

32. The method of claim 1, wherein the compound does not contain an additional support.

33. The method of claim 15, wherein substantially no binder is used.

34. The method of claim 15, wherein the compound does not contain an additional support.

35. The method of claim 15, wherein the additional metal component comprises magnesium, calcium, or a combination thereof.

36. The method of claim 35, wherein the additional metal component comprises calcium oxide.

37. The method of claim 36, wherein the compound comprises about 10% calcium oxide.

38. The method of claim 36, wherein the compound comprises about 20% calcium oxide.

39. The method of claim 35, wherein the additional metal component comprises calcium hydroxide.

40. The method of claim 39, wherein the compound comprises about 10% calcium hydroxide.

41. The method of claim 39, wherein the compound comprises about 20% calcium hydroxide.

42. The method of claim 35, wherein the additional metal component comprises calcium carbonate.

43. The method of claim 42, wherein the compound comprises about 10% calcium carbonate.

44. The method of claim 42, wherein the compound comprises about 20% calcium carbonate.

45. The method of claim 35, wherein the additional metal component comprises magnesium oxide.

46. The method of claim 45, wherein the compound comprises about 10% magnesium oxide.

47. The method of claim 45, wherein the compound comprises about 20% magnesium oxide.

48. The method of claim 35, wherein the additional metal component comprises magnesium hydroxide.

49. The method of claim 48, wherein the compound comprises about 10% magnesium hydroxide.

50. The method of claim 48, wherein the compound comprises about 20% magnesium hydroxide.

51. The method of claim 35, wherein the additional metal component comprises magnesium carbonate.

52. The method of claim 51, wherein the compound comprises about 10% magnesium carbonate.

53. The method of claim 51, wherein the compound comprises about 20% magnesium carbonate.

* * * * *

UNITED STATES PATENT AND TRADEMARK OFFICE
CERTIFICATE OF CORRECTION

PATENT NO. : 7,361,264 B2
APPLICATION NO. : 11/137764
DATED : April 22, 2008
INVENTOR(S) : Vierheilig It is certified that error appears in the above-identified patent and that said Letters Patent is hereby corrected as shown below:

Column 5, lines 32 and 36, delete "C." and insert instead --C--.

Column 6, lines 62-66, each time it appears other than at the end of a sentence, delete "C." and insert instead --C--.

Column 7, lines 34-38, each time it appears other than at the end of a sentence, delete "C." and insert instead --C--.

Column 10, line 65, delete "C." and insert instead --C--.

Column 11, line 3, delete "C." and insert instead --C--.

Columns 11-12, lines 25-40 (approx), delete TABLE 1 and insert instead:

Table 1. Improved FCC Catalyst Performance Results

| Test Run | MMO Additive | Conversion (%) | LPG (C3+C4) Yield | Gasoline Yield (%) | LCO Yield (%) | Bottoms Yield (%) | Coke Yield (%) | H-Gas Yield (%) |
|---|---|---|---|---|---|---|---|---|
| A | None | 67.6 | 16.9 | 35.2 | 20.6 | 11.8 | 12.0 | 0.97 |
| B | HTLP | 73.4 | 20.1 | 39.6 | 17.7 | 8.9 | 10.5 | 0.67 |
| C | HTLP/ 20% Ca(OH)$_2$ | 77.1 | 22.9 | 43.1 | 16.2 | 6.7 | 8.1 | 0.45 |
| D | HTLP/ 20% CaCO$_3$ | 76.6 | 22.4 | 42.2 | 16.6 | 6.9 | 8.9 | 0.54 |

Column 12, lines 1-15 (approx), delete TABLE 2 and insert instead:

Table 2. Improved FCC Catalyst Characteristics

| Test Run | Additive Used | Relative Peak (6.3° 2-θ) Height | Surface Area (m$^2$/g) |
|---|---|---|---|
| A | None | 1.0 | 71 |
| B | HTLP | 3.9 | 97 |
| E | HTLP / 10% Ca(OH)$_2$ | 5.4 | 118 |
| D | HTLP / 20% CaCO$_3$ | 7.4 | 114 |
| F | Fresh Catalyst (No Metallization) | 30 | 160 |

UNITED STATES PATENT AND TRADEMARK OFFICE
CERTIFICATE OF CORRECTION

PATENT NO. : 7,361,264 B2
APPLICATION NO. : 11/137764
DATED : April 22, 2008
INVENTOR(S) : Vierheilig It is certified that error appears in the above-identified patent and that said Letters Patent is hereby corrected as shown below:

Column 12, lines 57-66 (approx), delete TABLE 3 and insert instead:

Table 3. Improved Octane Rating of Gasoline

| Test Run | Additive Used | Total RON | Total MON | (R+M)/2 |
|---|---|---|---|---|
| A | None | 81.8 | 75.0 | 78.4 |
| B | HTLP | 85.2 | 78.3 | 81.8 |
| C | HTLP / 20% Ca(OH)$_2$ | 86.8 | 79.5 | 83.1 |
| D | HTLP / 20% CaCO$_3$ | 86.7 | 79.3 | 83.0 |

Column 13, lines 21-34 (approx), delete TABLE 4 and insert instead:

Table 4. Decreased Sulfur Levels of Gasoline

| Test Run | Additive Used | Conversion (%) | Gasoline Yield (%) | S Concentration (ppm) |
|---|---|---|---|---|
| G | None | 67.2 | 42.3 | 219 |
| H | HTLP / 10% CaO | 77.2 | 48 | 178 |

Column 13, line 67, in claim 1, delete "compounds" and insert instead --compound--.

Signed and Sealed this

Second Day of December, 2008

JON W. DUDAS
*Director of the United States Patent and Trademark Office*